(12) United States Patent
Pandit

(10) Patent No.: US 8,868,787 B2
(45) Date of Patent: Oct. 21, 2014

(54) INCREMENTAL DOWNLINK OF FLIGHT INFORMATION

(75) Inventor: Anil Kumar Pandit, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 515 days.

(21) Appl. No.: 11/964,351

(22) Filed: Dec. 26, 2007

(65) Prior Publication Data
US 2009/0172080 A1 Jul. 2, 2009

(51) Int. Cl.
*G06F 15/16* (2006.01)

(52) U.S. Cl.
CPC ..................................... *G06F 15/16* (2013.01)
USPC ............ 709/247; 707/201; 715/804; 719/328

(58) Field of Classification Search
USPC ....................................................... 353/13, 14
See application file for complete search history.

(56) References Cited

U.S. PATENT DOCUMENTS

| | | | |
|---|---|---|---|
| 5,838,262 A | 11/1998 | Kershner et al. | |
| 6,192,518 B1 * | 2/2001 | Neal | 717/175 |
| 6,587,125 B1 * | 7/2003 | Paroz | 715/740 |
| 6,917,863 B2 * | 7/2005 | Matos | 701/16 |
| 6,937,164 B2 * | 8/2005 | Thomson et al. | 340/945 |
| 7,010,398 B2 | 3/2006 | Wilkins, Jr. et al. | |
| 7,586,514 B1 * | 9/2009 | Salazar et al. | 348/144 |
| 2003/0093187 A1 | 5/2003 | Walker | |
| 2004/0083453 A1 * | 4/2004 | Knight et al. | 717/113 |
| 2004/0117507 A1 * | 6/2004 | Torma | 709/248 |
| 2005/0109872 A1 * | 5/2005 | Voos et al. | 244/3.17 |
| 2005/0216138 A1 * | 9/2005 | Turung | 701/3 |
| 2006/0005207 A1 * | 1/2006 | Louch et al. | 719/328 |
| 2006/0168536 A1 * | 7/2006 | Portmann | 715/762 |
| 2007/0101291 A1 * | 5/2007 | Forstall et al. | 715/805 |
| 2007/0112880 A1 * | 5/2007 | Yang et al. | 707/201 |
| 2007/0130541 A1 * | 6/2007 | Louch et al. | 715/804 |
| 2007/0244608 A1 * | 10/2007 | Rath et al. | 701/3 |
| 2008/0040681 A1 * | 2/2008 | Synstelien et al. | 715/765 |
| 2008/0046872 A1 * | 2/2008 | Cooper | 717/140 |
| 2008/0091777 A1 * | 4/2008 | Carlos | 709/204 |

\* cited by examiner

*Primary Examiner* — Andrew Goldberg
(74) *Attorney, Agent, or Firm* — Fogg & Powers LLC

(57) ABSTRACT

A method for providing flight information to a ground server is provided. The flight information is received from an aircraft system. The flight information is converted into a graphical representation and a plurality of properties associated with the flight information. The graphical representation and the plurality of properties is stored. The graphical representation and the plurality of properties is processed to generate a compressed graphical representation and plurality of properties having a compressed file size. The compressed plurality of properties is transmitted to the ground server.

11 Claims, 4 Drawing Sheets

US 8,868,787 B2

INCREMENTAL DOWNLINK OF FLIGHT INFORMATION

FIELD OF THE INVENTION

The present invention generally relates to aircraft systems, and more particularly, but not exclusively, to a system, method, and computer program product for incrementally providing flight information of an aircraft to a ground server.

BACKGROUND OF THE INVENTION

Flight displays provide flight information to the pilot in order for control of the flight in both normal and unusual conditions. For example, in the unlikely event that problems in a flight system were to occur, the flight display may provide the pilot with flight information relevant to the problem for the pilot to take corrective action, if necessary. Such flight information may be obtained from flight manuals of the aircraft to provide specific instructions for the pilot.

Generally, one of the primary responsibilities of the pilot is to remain at the controls of the aircraft while in contact with air traffic control (ATC). As a result, in some cases it may be difficult for a pilot to monitor flight information as presented on the flight displays by directing his attention away from the controls and ATC. Pressures associated with the responsibility of continuing to oversee flight controls and communications with ATC during a problem may cause the pilot to not follow or misinterpret the specific instructions provided on the display.

Accordingly, it is desirable to provide a method for providing flight information in real time to equipment and personnel on the ground, so that the pilot may be assisted in the unlikely event of a problem. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In one embodiment, by way of example only, a method for providing flight information to a ground server is provided. The flight information is received from an aircraft system. The flight information is converted into a graphical representation and a plurality of properties associated with the flight information. The graphical representation and the plurality of properties are stored. The graphical representation and the plurality of properties are processed to generate a compressed graphical representation and plurality of properties having a compressed file size. The compressed plurality of properties is transmitted to the ground server.

In another embodiment, again by way of example only, a system for providing flight information to a ground server is provided. A graphics server is coupled to at least one aircraft system. The graphics server is configured to receive the flight information from the at least one aircraft system, convert the flight information into a graphical representation and a plurality of properties associated with the flight information, store the graphical representation and the plurality of properties, process the graphical representation and the plurality of properties to generate a compressed graphical representation and plurality of properties having a compressed file size, and transmit the compressed plurality of properties to the ground server.

In still another embodiment, again by way of example only, a computer program product for providing flight information to a ground server is provided. The computer program product comprises a computer-readable storage medium having computer-readable program code portions stored therein. The computer-readable program code portions comprise a first executable portion configured to receive the flight information from the at least one aircraft system, a second executable portion configured to convert the flight information into a graphical representation and a plurality of properties associated with the flight information, a third executable portion configured to store the graphical representation and the plurality of properties, a fourth executable portion configured to process the graphical representation and the plurality of properties to generate a compressed graphical representation and plurality of properties having a compressed file size, and a fifth executable portion configured to transmit the compressed plurality of properties to the ground server.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The present description and following claimed subject matter present exemplary system, method, and computer program product embodiments for providing flight information, such as flight manual information, to a ground server. Such flight information may be used by ground equipment and personnel to assist the pilot. These embodiments may utilize a display graphics server, which may collect, store, and compress flight information for incremental downlink to a ground server. The flight information may be converted into graphical representations. Throughout this specification, the graphical representations of such flight information may be referred to as "widgets." The widgets and accompanying properties and parameters may be sent to the ground server to assist the pilot. In the event that widgets are already stored on the ground, the system herein described may only send relevant properties and parameters of the widget to save communications bandwidth. Other features of the present description and claimed subject matter will be further described below.

Figure 1:
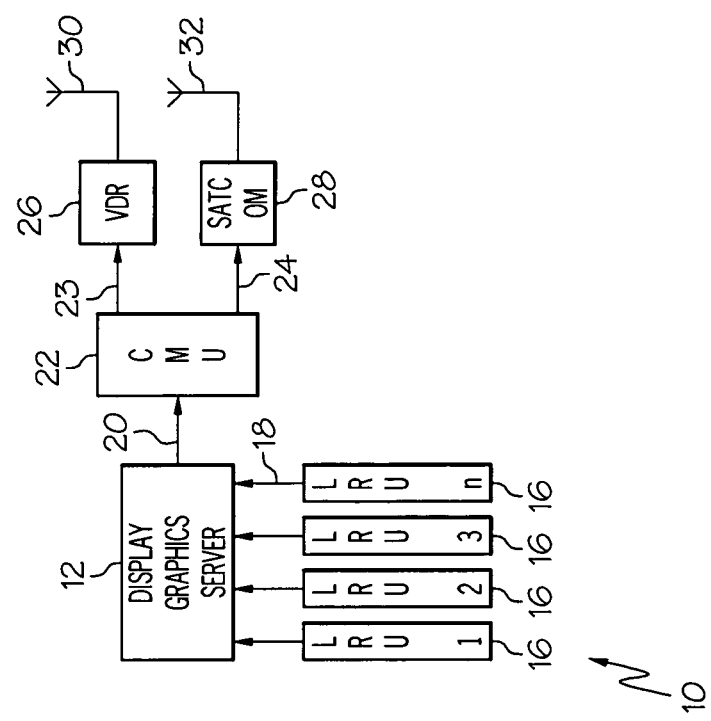
FIG. 1 is a block diagram of an exemplary system for providing flight information to a ground server.

Turning to FIG. 1, a block diagram of an exemplary system 10 for providing flight information to a ground server is depicted. System 10 includes a display graphics server module 12, and a plurality of line replaceable units (LRUs) 16. Each of the LRUs 16 may comprise an aircraft system, such as an avionics, power, or flight data system. Each of the LRUs 16 may be a self-contained system. In one example, an aircraft power LRU 16 may control aircraft power functionality, while supplying power data relating to aircraft power over communications channel 18 to the display graphics server 12. Such power data may include data relating to power systems, power generation, and the like. In the unlikely event of a problem relating to the power LRU, such as a power interruption or a sensor failure, such data may be relayed to the display graphics server 12 over communications channel 18. This data may include information such as the nature or source of the problem, affected subsystems, and corrective action(s) to be taken (or automatically taken by default). Each LRU 16 may be coupled to sources of data (such as the aforementioned sensor). LRU 16 may include, or may be coupled to aircraft condition monitoring systems (ACMS) or receive ACMS data. Further, LRU 16 may include or may be coupled to a central maintenance computer (CMC) or receive CMC data.

The particular functionality of display graphics server module 12 will be further described below. Display graphics server 12 is also in electrical communication with a communications management unit (CMU) 22 of the aircraft via communications channel 20. CMU 22 may perform functionality relating to the facilitation, oversight and management of communications data to and from the display graphics server 12, and the aircraft at large. CMU 22 is in communication with a transceiver 26 such as a VHF data radio (VDR) utilizing communications channel 23, and a satellite communication system (SATCOM) 28 utilizing communications channel 24. Each of the transceiver 26 and SATCOM 28 are connected to antennas 30 and 32, respectively, for sending and receiving communications transmissions from a ground server (not shown). Transceiver 26 and/or SATCOM 28 may be compatible with a variety of communications protocols, such as an IEEE 802.xx standard including WiMAX and equivalent transmission protocols, as one skilled in the art will appreciate.

Figure 2:
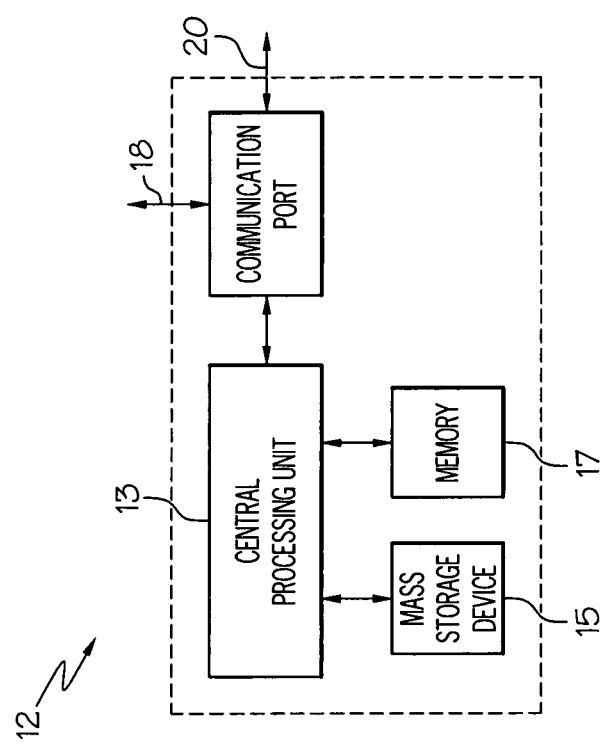
FIG. 2 is a block diagram of an exemplary display graphics server.

FIG. 2, in block diagram form, depicts display graphics server 12 in further detail. As one skilled in the art will appreciate, display graphics server 12 may include the described components, or may include additional components to suit a particular application. In the depicted embodiment, server 12 includes a central processing unit (CPU) 13, a mass storage device 15 such as a hard disk drive (HDD), memory 17, and a communication port 19. Port 19 is coupled to communications channels 18 and 20 as previously described.

In the unlikely event of an aircraft problem, display graphics server 12 may be configured to sense/detect the problem. The problem may also be relayed to display graphics server 12 from another source. Once a problem is detected and/or received, the display graphics server 12 may be configured to trigger a data communication with the ground server. The ground server may be coupled to the air traffic control (ATC) system of a particular region. The data communication may include data typically passed to the flight display ("display pages") for a pilot to utilize when responding the particular problem.

Through the use of hardware such as CPU 13, mass storage device 15 and memory 17, software, firmware, or a combination thereof, the server 12 may be configured to receive flight information (such as the aforementioned ACMS data) from an aircraft system. The server 12 converts the flight information into a graphical representation and a plurality of properties associated with the flight information. The graphical representation may include an icon or symbol representative of the particular flight information. Again, these graphical representations may also be described as widgets.

A widget, for example, may include a graphic object displayed on a graphics screen. One display page could consists of several widgets, each widget positioned uniquely on the screen to prevent any overlap of the objects. One example of a widget is a radial oil level indicator with an numeric display. The radial dial of the indicator consists of a pointer indicating the level of the oil quantity over the an arc extending 315 deg to 160 deg on the circumference. The numeric display is positioned within the circumference, typically between the 180 to 270 degree quadrant. The pointer color and numeric display color may be configured to change to amber when the oil quantity lies in a specific range and red when the oil quantity falls below a pre-determined value, for example.

Graphical representations may include properties and/or parameters associated with the graphical representations. For example, a particular widget may be associated with basic widget properties, such as the widget's position on a particular display page. In another example, a particular widget may include a pointer positioned over a radial meter or numeric value being displayed in the numeric area of a particular indicator. In still another example, a particular widget may be associated with a color of a pointer or numerals being displayed when particular engineering units the graphics object represents lies in between a predetermined value range.

Server module 12 may be configured with the overall intent that flight information (such as that displayed as display pages) may be converted into graphical information (versus the use of textual information) to better assist the pilot in the unlikely event of a problem.

Server 12 may be configured to store the graphical representations and properties through, for example, the use of mass storage device 15 and/or memory 17. Once a particular widget and the properties associated with the widget are converted and stored, the server 12 processes the widget and widget properties to reduce the file sizes of the widget and widget properties. For example, the CPU 13 may process a particular widget/properties through a compression algorithm to generate a compressed widget with compressed associated properties. The compressed widget/properties may be again stored.

With the assistance of CMU 22, server 12 may transmit the compressed widget(s) and/or properties to the ground server. In one embodiment, the transmittal of widget(s) and/or properties may occur subsequent to a request by the ground server. In other embodiments, the transmittal may be triggered by an event. For example, if a particular event or condition associated with the fuel system is detected by server 12, the detection itself may trigger the request for a connection between aircraft and ground server by server 12 to transfer widgets and properties/parameters relevant to the event or condition.

The compressed widgets and/or properties may be transmitted on an incremental basis to save communications bandwidth and to ensure that the data is passed in real-time. Such incremental transmission functionality will be further described. Server 12 may be configured to query the ground server to determine if the widgets are already available and/or stored on the ground server. If the ground server sends a transmission indicating that the widgets are indeed there, then the server 12 may only send widget properties/parameters. Finally, if widget and/or properties data have been modified since a previous transmittal, the server 12 may be configured to continually operate to detect such modifications, convert such modified data into modified graphical representations, store the modified representations and properties, compress the modified representations and properties to reduce file sizes, and transmit the modified representations and/or properties to the ground server.

Figure 3:
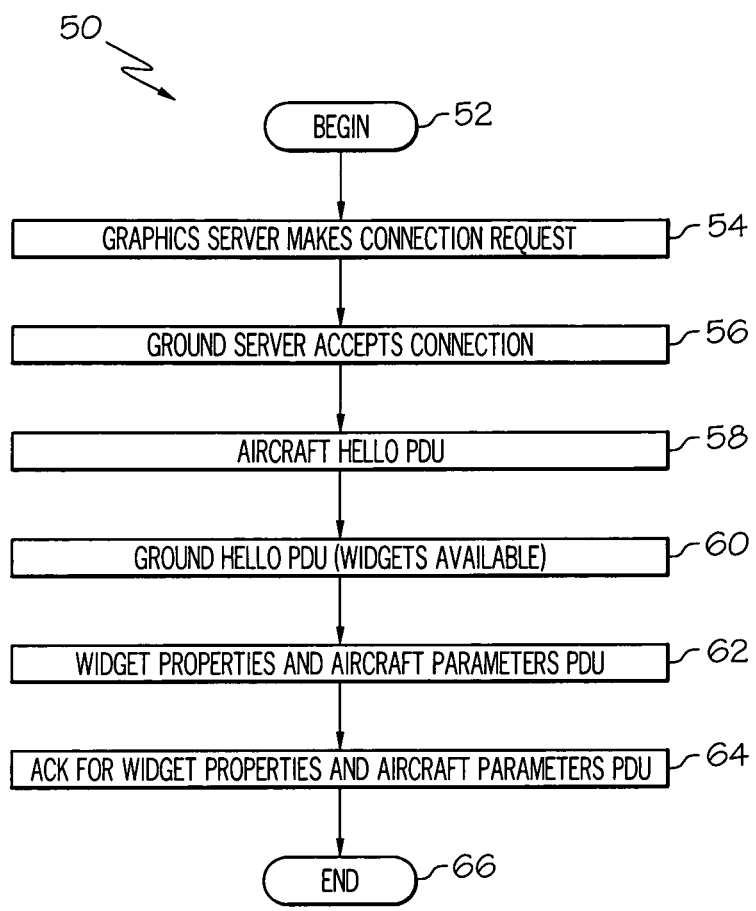
FIG. 3 illustrates a first exemplary method for providing flight information to the ground server.

FIG. 3 illustrates a first exemplary method 50 for transmitting flight information to a ground server. As will be seen, FIGS. 3 and 4 describe exemplary behavior between the graphics server and the ground server.

Method 50 begins (step 52) with the graphics server making a connection request to the ground server (step 54). In one embodiment, the graphics server obtains system failures from the ACMS, triggering the initiation of the connection from the graphics server (onboard the aircraft) with the Ground Server System. This is followed by the initial handshake initiated from the display graphics server to authenticate and validate the aircraft.

The ground server then accepts the data connection (step 56) as part of the initial handshake sequence. The graphics server sends a suitable response, such as an "Aircraft Hello" portable data unit (PDU) to the ground server (step 58). This response may include data such as aircraft type, aircraft tail number, and International Civil Aviation Organization (ICAO) address. On receiving the response, the ground server validates the aircraft, and checks to see if widgets for the aircraft being connected are available (e.g., stored locally). If the widgets are available, the ground server sends a suitable response, such as a "Ground Hello" PDU with the parameter WIDGETS_ALREADY_AVAILABLE set (step 60). This indicates to the graphics server that the relevant widgets are available locally, and that it is not necessary to resend.

The graphics server then sends a suitable response, (e.g., a widget properties and aircraft parameters PDU) in a compressed format (step 62). This data when received by the ground server is saved. The ground server then sends an acknowledgement (ACK) that the response (again, e.g., the properties and parameters PDU) has been received (step 64). From this point onwards, the graphics server sends only data relating to aircraft parameters and properties that have been modified to reduce bandwidth usage and provide real-time data. Method 50 then ends (step 66).

The above mentioned mechanism described by method 50 utilizes network bandwidth only when a system event (such as a system failure) occurs. This reduces resource overhead, and utilizes bandwidth efficiently, as crucial data is transferred only in response to an absolute necessity.

Figure 4:
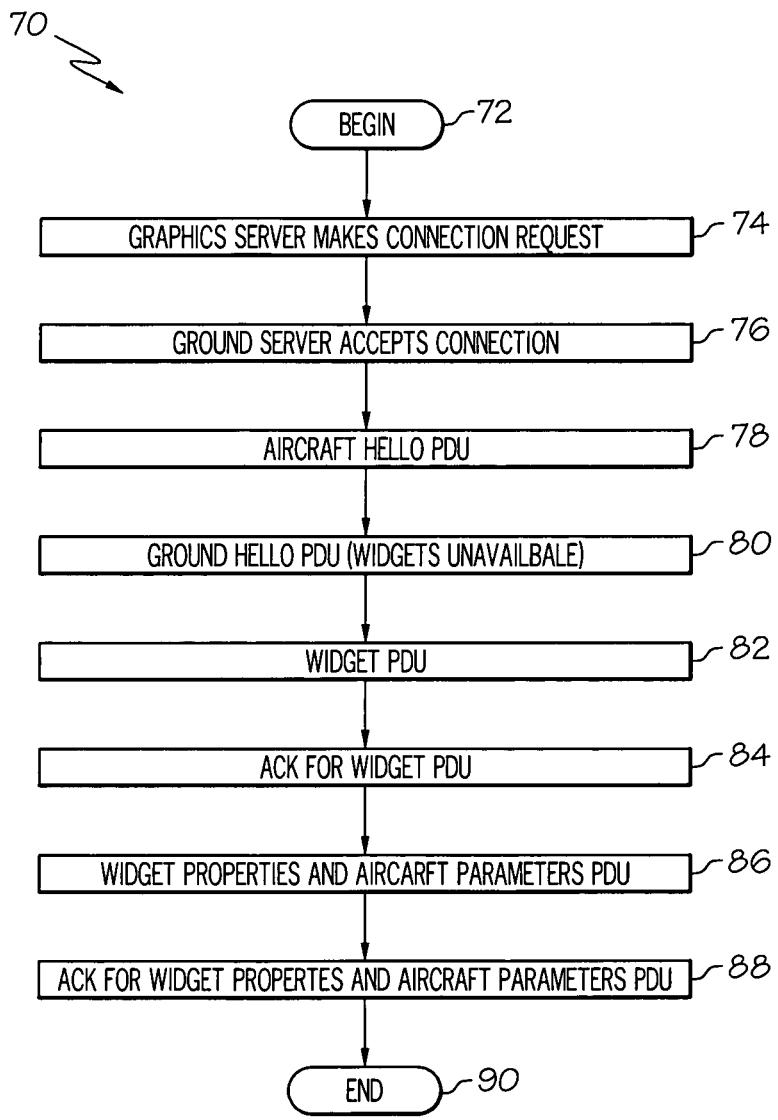
FIG. 4 illustrates a second exemplary method for providing flight information to the ground server.

FIG. 4 illustrates a second exemplary method 70 for transmitting flight information to a ground server, with the assumption that the relevant widgets are not available locally on the ground. Method 70 again begins (step 72) with the connection request (step 74) and connection acceptance (step 76) seen previously. Again, the aircraft sends a suitable response (e.g., Hello PDU) to the ground server (step 78). In this case, however, the ground server determines that the relevant widgets are not available for the aircraft, and a suitable response (e.g., a Ground Hello PDU) is sent with the parameter WIDGETS_ALREADY_AVAILABLE not set (or set to zero) (step 80).

The graphics server then sends the compressed widgets in a suitable response (e.g., a Widget PDU) (step 82), and the ground server sends an acknowledgement message (step 84). The graphics server then sends the related widget properties and parameters PDU (step 86) in a step similar to that of FIG. 3. The ground server then sends an acknowledgement message (step 88). The method 70 then ends.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for providing flight information to a ground server, the method being performed by a computing device comprising a processor and memory,
    the method comprising:
        receiving, at a graphics server in an aircraft, the flight information from an aircraft system;
        converting, in the graphics server, the flight information into a graphic object representative of the flight information and a plurality of properties associated with the flight information and the graphic object;
        storing the graphic object and the plurality of properties associated with the graphic object and the flight information;
        processing, in the graphics server, the graphic object and the plurality of properties associated with the graphic object and the flight information to generate, respectively, a compressed graphic object and compressed plurality of properties;

querying a ground server when an error is detected in the aircraft to determine whether the graphic object is available on the ground server;

transmitting the compressed graphic object and the compressed plurality of properties to the ground server if the graphic object is not found on the ground server;

transmitting only the compressed plurality of properties to the ground server if the graphic object is found on the ground server; and retransmitting only the plurality of properties associated with the graphic object and the flight information that have been modified from a previous transmission.

2. The method of claim 1, wherein transmitting the compressed graphic object and the compressed plurality of properties to the ground server includes transmitting the compressed graphic object, waiting for a first acknowledgment message from the ground server, and transmitting the compressed plurality of properties to the ground server.

3. The method of claim 2, wherein transmitting the compressed graphic object and the compressed plurality of properties to the ground server further includes, subsequent to transmitting the compressed plurality of properties to the ground server, waiting for a second acknowledgement message from the ground server.

4. A system for providing flight information to a ground server, comprising:

a graphics server coupled to at least one aircraft system, the graphics server comprising a processing unit and storage device configured to:

receive the flight information from the at least one aircraft system;

convert the flight information into a graphic object representative of the flight information and a plurality of properties associated with the flight information and the graphic object;

store the graphic object and the plurality of properties associated with the graphic object and the flight information;

process the graphic object and the plurality of properties associated with the graphic object and the flight information to generate, respectively, a compressed graphic object and compressed plurality of properties;

query a ground server when an error is detected in the aircraft to determine whether the graphic object is available on the ground server;

transmit the compressed graphic object and the compressed plurality of properties to the ground server if the graphic object is not found on the ground server;

transmit only the compressed plurality of properties to the ground server if the graphic object is found on the ground server; and retransmit only the plurality of properties associated with the graphic object and the flight information that have been modified from a previous transmission.

5. The system of claim 4, wherein the graphics server is further configured to receive a request from the ground server prior to transmitting.

6. The system of claim 4, wherein the graphics server is further configured to transmit the compressed graphic object, wait for a first acknowledgment message from the ground server, and transmit the compressed plurality of properties to the ground server.

7. The system of claim 6, wherein the graphics server is further configured to, subsequent to transmitting the plurality of properties to the ground server, wait for a second acknowledgement message from the ground server.

8. The system of claim 4, wherein the flight information includes aircraft condition monitoring system (ACMS) and central maintenance computer function (CMCF) data.

9. The system of claim 4, wherein the at least one aircraft system includes a line replaceable unit (LRU).

10. The system of claim 4, wherein the graphics server is coupled to a communications management unit (CMU) for managing the transmittal of the compressed plurality of properties to the ground server.

11. The system of claim 10, wherein the CMU is coupled to a transceiver for transmitting the compressed plurality of properties to the ground server.

* * * * *